United States Patent Office 2,767,049
Patented Oct. 16, 1956

2,767,049

PREPARATION OF CHALCOGENIDES

Rudolf Nitsche, Heidelberg-Rohrbach, Germany, assignor to E. I. du Pont de Nemours and Company, Wilmington, Del., a corporation of Delaware No Drawing. Application October 15, 1954,
Serial No. 462,627

11 Claims. (Cl. 23—50)

This invention relates to a process for the preparation of zinc and cadmium chalcogenides. More particularly it relates to a process for the preparation of zinc and cadmium and mixed zinc-cadmium selenides and tellurides.

Various methods for the preparation of zinc and cadmium chalcogenides are known. Some of them are useful only on a laboratory scale, because of the economics involved. In the procedures which are carried out with elemental chalcogens, or with solid and gaseous reactants, it is difficult to obtain products of high purity. In aqueous ionic reactions, products of higher purity are obtained. Usually gaseous hydrogen chalcogenides are employed as reactants, the gaseous phase providing a convenient means of purification. Sulfides and selenides thus can be obtained in satisfactory yield and quality. In large scale production the extreme toxicity of the hydrogen chalcogenides, however, constitutes a serious problem. Tellurides cannot be made in this way because of the instability of $H_2Te$. Contrary to $H_2Se$, $H_2Te$ is only obtained in very small amounts from $Al_2Te_3$ due to self decomposition in statu nascendi.

An object of this invention is to provide a new process for the preparation of zinc and cadmium selenides and tellurides. Another object is to provide such a process which gives good yields of such chalcogenides. Yet another object is to provide such a process which results in such selenides and tellurides which have a high degree of purity. A further object is to provide a practical process of preparing zinc and cadmium selenides and tellurides which utilizes relatively inexpensive and available starting materials. A still further object is to provide such a process which eliminates the use of highly toxic hydrogen chalcogenides. Still other objects will be apparent from the following description of the invention.

It has been found that zinc and cadmium and zinc-cadmium selenides and tellurides can be prepared in a high degree of purity by reacting an aluminum chalcogenide, i. e. a selenide or telluride containing an excess (e. g., 2 to 5 gram-atoms or more) of aluminum over the stoichiometric amount, with ammonia, by dissolving the chalcogenide in an aqueous ammonia solution, removing the surplus aluminum and aluminum hydroxide by filtration, admixing the ammonium chalcogenide solution with an aqueous solution containing a water-soluble zinc and/or cadmium salt which forms an ammonium complex, e. g., a halide wherein said halogen has an atomic weight of at least 35 or the sulfate, nitrate or acetate, while under the protective atmosphere of an inert gas, i. e., nitrogen, neon, argon, krypton and xenon or hydrogen or helium, which are non-oxidizing gases. The reactions are carried out in the absence of oxygen or oxidizing gases.

In the case of preparing zinc selenide, the reactions in the first stage of the above process take place in accordance with the following equations:

$$Al_2Se_3 + 6H_2O = 2Al(OH)_3 + 3H_2Se$$
$$H_2Se + 2NH_3 = (NH_4)_2Se$$

The second phase of the reaction is a simple metathetical reaction whereby the zinc or cadmium selenide or telluride or zinc and cadmium selenide or telluride are precipitated out of the aqueous solution.

The reactants of this second phase are generally used in approximately equivalent amount but an excess of either reactant gives useful results. In the formation of the ammonium selenide or telluride, however, an excess of at least 25% of ammonia gives improved results. Excesses of 300% and more are useful.

Upon admixing the reactants and purging oxygen from the reaction zone by means of a stream of inert gas, the reaction zone or vessel is heated to a moderate temperature, e. g., 50° C. to 60° C., to initiate the reaction in the formation of the ammonium selenide. The reaction is slightly exothermic and can be controlled easily.

After removal of the zinc or cadmium or zinc-cadmium selenide or telluride from the reaction medium, it can be washed with water and dried at normal pressure, or preferably at a reduced pressure, e. g., 25 to 759 mm. Hg, to remove water. The resulting chalcogenide has a high degree of purity and is suitable for making phosphors and semiconductors.

The invention will be further illustrated but is not intended to be limited by the following examples.

Example I

Forty-three grams of $Al_2Se_3$ containing 250% excess of aluminum is admixed with 200 cc. of concentrated aqueous ammonia solution in a reaction vessel. Air is removed from the vessel by passing a stream of nitrogen through the solution. The admixture is heated to a temperature of 60° C. to dissolve the $Al_2Se_3$ and initiate the reaction with the ammonia solution while continuing the passage of a slow stream of nitrogen gas through the solution to insure an inert atmosphere and provide agitation of the mixture. Upon completion of the reaction, the aluminum hydroxide and aluminum is filtered off by reducing the pressure beneath the filter to about 100 mm. Hg and a purified ammoniacal solution containing 75 grams zinc acetate and 2.3 grams cadmium acetate is slowly admixed with the ammonium selenide solution. The yellow-brown precipitate of zinc-cadmium selenide is filtered, washed twice with double-distilled water and dried at a reduced pressure of 50 mm. Hg. The product is obtained in an amount of 50 grams (yield 98%). The product contains Zn and Cd in the proportion of 97.5:2.5.

The product has a high degree of purity and if activated with copper and crystallized at a temperature of 950° C., is an efficient phosphor emitting red light under cathode ray excitation.

Example II

Thirty grams of $Al_2Te_3$ containing 200% excess of aluminum is admixed with 200 cc. of concentrated aqueous ammonia solution (28% $NH_3$, sp. gr. 0.90) and 200 grams of ice in a reaction vessel. Air is removed from the vessel by passing a stream of nitrogen through the solution. The reaction is exothermic. The ice controls the temperature to between 30° C. and 40° C. A slow stream of nitrogen gas is continuously passed through the solution to insure an inert atmosphere and provide agitation of the mixture. Upon completion of the reaction, the aluminum hydroxide and aluminum is filtered off by reducing the pressure beneath the filter to about 100 mm. Hg and a purified ammoniacal solution containing 40 grams zinc acetate is slowly admixed with the ammonium telluride solution. The yellow-brown precipitate of zinc telluride (ZnTe·H₂O) is filtered; and dried at a reduced pressure of 50 mm. Hg. The product is obtained in an amount of 34.5 grams (yield 98%).

The processes described above can be carried out batchwise or in a continuous process by continuously adding reactants and removing the products. Any of the conventional laboratory apparatus can be used. The process can be readily adapted to a plant scale.

An advantage of the process is that it produces the zinc and/or cadmium selenides and tellurides in good yields and a high degree of purity. Impurities are removed by absorption on the finely divided aluminum hydroxide, which is removed as a by-product.

Since a surplus of metallic aluminum is present in the $Al_2Se_3$ and $Al_2Te_3$, all metals below aluminum in the electromotive series are precipitated, which is advantageous because it enables one to prepare a pure product in a relatively simple manner.

Another advantage of the invention is that it does not require the use of highly toxic gases $H_2Se$ and $H_2Te$, thus eliminating a potential safety hazard. A further advantage is that the starting materials are relatively cheap and are readily available.

I claim:

1. The process which comprises reacting an aluminum chalcogenide taken from the group consisting of aluminum selenide and aluminum telluride, said chalcogenide containing elemental aluminum, with an aqueous ammonia solution, removing the insoluble materials formed, admixing with the resulting solution of ammonium chalcogenide at least one water-soluble salt taken from the group consisting of zinc and cadmium salts which forms an ammonium complex and recovering the metal chalcogenide, the reactions being carried out under an inert atmosphere.

2. The process which comprises reacting an aluminum chalcogenide taken from the group consisting of aluminum selenide and aluminum telluride, containing at least two gram-atoms of elemental aluminum for each gram-molecule of said chalcogenide, with an aqueous ammonia solution, removing the insoluble materials formed, admixing with the resulting solution of ammonium chalcogenide at least one water-soluble salt taken from the group consisting of zinc and cadmium salts which forms an ammonium complex and recovering the metal chalcogenide, the reactions being carried out under an inert atmosphere.

3. A process as set forth in claim 2 wherein said inert atmosphere is nitrogen.

4. The process which comprises reacting aluminum selenide containing at least two gram-atoms of elemental aluminum for each gram-molecule of said selenide with aqueous ammonia, filtering the resulting solution, admixing with the filtrate at least one water-soluble salt taken from the group consisting of zinc and cadmium salts which forms an ammonium complex and recovering the metal chalcogenide, the reactions being carried out under an inert atmosphere.

5. A process as set forth in claim 4 wherein said inert atmosphere is nitrogen.

6. The process which comprises reacting aluminum telluride containing at least two gram-atoms of elemental aluminum for each gram-molecule of said telluride with aqueous ammonia filtering the resulting solution and admixing with the filtrate at least one water-soluble salt taken from the group consisting of zinc and cadmium salts which forms an ammonium complex and recovering the metal chalcogenide, the reactions being carried out under an inert atmosphere.

7. A process as set forth in claim 6 wherein said inert atmosphere is nitrogen.

8. The process of preparing zinc-cadmium selenide which comprises admixing aluminum selenide containing at least two gram-atoms of elemental aluminum for each gram-molecule of said aluminum selenide with a concentrated aqueous solution of ammonia, heating the solution to a temperature between 50° C. and 60° C. to initiate the reaction, filtering the reaction mixture, admixing with the filtrate an aqueous ammoniacal solution containing zinc acetate and cadmium acetate and recovering the zinc cadmium selenide and drying the latter.

9. The process of preparing zinc telluride which comprises admixing aluminum telluride containing at least two gram-atoms of elemental aluminum for each gram-molecule of said aluminum telluride with a concentrated aqueous solution of ammonia, cooling the solution to a temperature between 30° C. and 40° C. to control the reaction, filtering the reaction mixture, admixing with the filtrate and aqueous ammoniacal solution containing zinc acetate and recovering the zinc telluride and drying the latter.

10. The process of preparing zinc-cadmium selenide which comprises admixing aluminum selenide containing at least two gram-atoms of elemental aluminum for each gram-molecule of said aluminum selenide with a concentrated aqueous solution of ammonia, heating the solution to a temperature between 50° C. and 60° C. to initiate the reaction, filtering the reaction mixture, admixing with the filtrate an aqueous ammoniacal solution containing zinc chloride and cadmium chloride and recovering the zinc cadmium selenide and drying the latter.

11. The process of preparing zinc telluride which comprises admixing aluminum telluride containing at least two gram-atoms of elemental aluminum for each gram-molecule of said aluminum telluride with a concentrated aqueous solution of ammonia, cooling the solution to a temperature between 30° C. and 40° C. to control the reaction, filtering the reaction mixture, admixing with the filtrate an aqueous ammoniacal solution containing zinc chloride and recovering the zinc telluride and drying the latter.

References Cited in the file of this patent

Mellor: "Comprehensive Treatise on Inorganic and Theoretical Chemistry," vol. X, 1930, pages 765 and 776.

Jacobsen: "Encyclopedia of Chemical Reactions"; vol. I, 1946, page 150; vol. II, 1948, page 8.